May 20, 1924.

W. S. HARLEY 1,494,784

HUB BEARING

Filed Jan. 26, 1921      2 Sheets-Sheet 1

Inventor:
William S. Harley.

By: Edwin B. H. Towry, Atty

May 20, 1924.

W. S. HARLEY

HUB BEARING

Filed Jan. 26, 1921

Inventor:
William S. Harley.

By: Edwin B. H. Power Jr. Atty.

Patented May 20, 1924.

1,494,784

UNITED STATES PATENT OFFICE.

WILLIAM S. HARLEY, OF MILWAUKEE, WISCONSIN, ASSIGNOR TO HARLEY-DAVIDSON MOTOR CO., OF MILWAUKEE, WISCONSIN, A CORPORATION OF WISCONSIN.

HUB BEARING.

Application filed January 26, 1921. Serial No. 440,242.

*To all whom it may concern:*

Be it known that I, WILLIAM S. HARLEY, a citizen of the United States, residing at Milwaukee, in the county of Milwaukee and State of Wisconsin, have invented new and useful Improvements in Hub Bearings, of which the following is a specification.

This invention relates to a hub bearing.

The hub bearing to which this invention relates is particularly applicable for use on rear wheels of motorcycles, although it may be used on other vehicles.

Among the objects of this invention is to provide a bearing wherein there is no cramping action between the bearing surfaces.

Another object is to provide a bearing which automatically maintains the hub and axle in alinement.

Another object is to provide an improved wheel hub bearing.

Another object is to provide a bearing which takes up both the radial and end thrusts.

Another object is to provide a bearing wherein the entire radial thrust load is carried by the axle at two separated points thereof.

Another object is to provide a light-weight wheel hub which is durable.

Another object is to provide a bearing having a free rotary movement when the hub is distorted.

Other objects and advantages will hereinafter appear.

The views of the drawings are:

Figure 1:
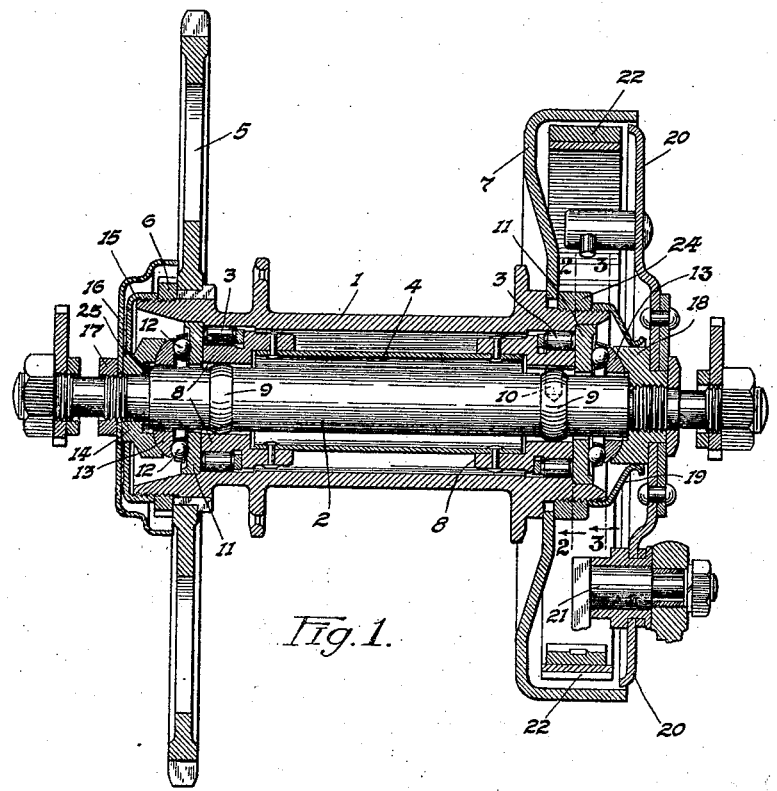
Fig. 1 shows a section of a rear hub bearing assembly.
Figure 2:
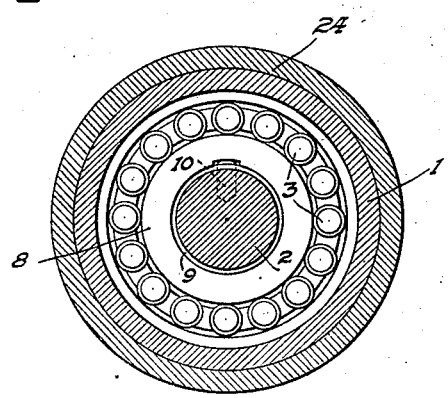
Fig. 2 is a vertical section on line 2—2 of Fig. 1.
Figure 3:
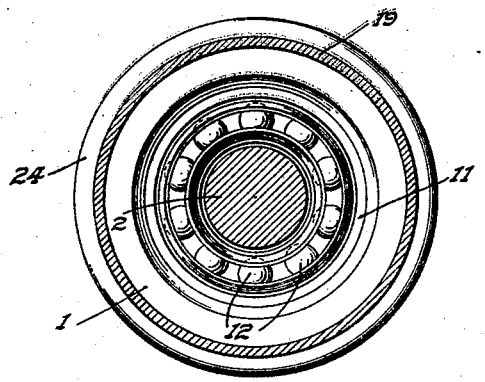
Fig. 3 is a vertical section on line 3—3 of Fig. 1.

The bearing illustrated in Figs. 1, 2 and 3 will first be described.

A hub shell 1 is mounted on an axle 2 by means of roller bearings 3 carried at the ends of a flexible sleeve 4 and surrounding the axle.

The flexible sleeve 4 is provided at each end with an annular extension or race ring 8 rigidly fastened thereto and surrounding the axle. Each of the race rings 8 rests on an arched bearing collar or circumferential bearing rib 9 formed on the axle 2 and is non-rotatably fastened thereto by a key or pin 10. The spherical shaped bearing collars 9 withstand the entire dead load or direct radial thrust and serve to prevent a retarding or braking effect on the wheel due to distortions of the axle. These distortions frequently occur when turning corners.

The roller bearings 3 are interposed between the hub 1 at each end thereof and the race rings 8, and are held in place by an annulus or disc 11. The roller bearings 3 carry the direct radial thrust and most of the load is borne by these bearings.

The outer face of the disc 11 is slightly grooved to form one race for the ball bearings 12. The opposite side of the ball race is formed in one side of a spherically sided thrust washer 13. The bearings 12 and washer 13 act automatically to keep the hub and axle in alinement and to prevent any cramping or braking action between the fixed and rotary parts due to end thrust or distortion of the hub.

The spherical or convex side of one of the washers 13 fits into the concave side of a collar 14 which is held in position by a nut 17 threaded on the axle 2, while the other washer 13 at the other end of the axle fits into the concave side of a nut 18 threaded on to the end of the axle.

An inner dirt protector 15 is threaded on the end of the hub shell 1 and an outer dirt protector 16 encloses the inner dirt protector and serves as a washer between the nut 17 and collar 14.

The dirt protector forms the subject matter of my copending application Serial No. 422,099 filed Nov. 5, 1920.

Between the collar 14 and a shoulder formed on the axle 2 are washers 25. These washers are used for adjustment of the ball bearings and to prevent cramping the balls when the nut 17 is screwed in place.

Surrounding the nut 18 and threaded on the end of the hub shell 1 is a dirt protector 19 which tends to keep dirt out of the bearings.

A sprocket or driving pulley 5 is mounted on one end of the hub shell 1 and is rigidly (though rotatably) fastened thereto by a lock nut 6.

A brake side cover or protector 20 is provided in which is mounted a stud 21 for supporting the actuating mechanism for the brake shoe 22.

Figure 4:
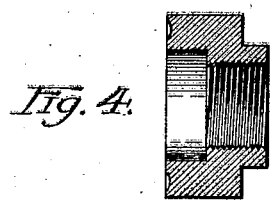
Fig. 4 shows an alternative form of one side of a ball-bearing race.

Instead of employing a self-alining end thrust washer or ball race 13 and a separate holding nut therefor, these two elements may be combined into one piece with a groove in one side for the ball race, as shown in Fig. 4.

Figure 5:
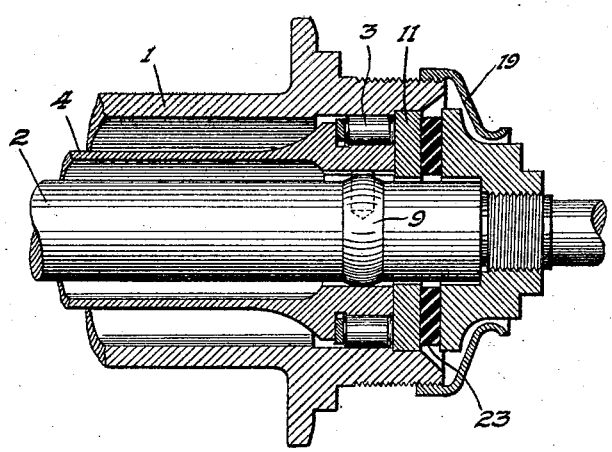
Fig. 5 shows an alternative form of one end of a rear hub assembly in section.

In the modification shown in Fig. 5, a fiber washer 23 is employed, instead of ball bearings, to take up the endwise thrust.

The flexible sleeve 4 is formed at each end thereof to provide races for the bearings 3. The race rings are thereby formed integral with sleeve 4.

Any distortion of the axle is absorbed between the bearing collars and the race rings seated thereon so that there is no cramping action on the roller bearings which are maintained in concentric relation to the hub casing and the race rings.

The invention contained herein is, of course, susceptible of other embodiments and adaptations.

The invention claimed is:

1. A wheel hub bearing comprising a hub casing, an axle concentrically disposed therein in spaced relation thereto, two arched collars for the axle spaced longitudinally thereon, an externally shouldered race ring seated on each collar, a spacing sleeve connected at the ends thereof to the race rings, a set of rotatable bearing members supported by each race ring and spacing the hub casing therefrom, and a retaining disk abutting each race ring.

2. A wheel hub bearing comprising a hub casing, an axle concentrically disposed therein in spaced relation thereto, two arched collars for the axle spaced longitudinally thereon, an externally shouldered race ring seated on each collar, a spacing sleeve connected at the ends thereof to the race rings, and means for locking the race rings and sleeve against rotation with respect to the axle.

3. A wheel hub bearing comprising a hub casing, an axle concentrically disposed therein in spaced relation thereto, two arched collars for the axle spaced longitudinally thereon, an externally shouldered race ring seated on each collar, a spacing sleeve connected at the ends thereof to the race rings, a set of rotatable bearing members supported by each race ring and spacing the hub casing therefrom, a retaining disk abutting each race ring; a retaining collar fastened to each end of the axle, and rotatable end thrust bearing members interposed between the respective retaining disks and collars.

4. A wheel hub bearing having in combination with the hub casing internally shouldered at each end and an axle concentrically disposed therein in spaced relation thereto, two spaced arched collars formed on the axle, an externally shouldered race ring seated on each collar, one such ring being keyed to the axle, a connecting sleeve spacing the race rings apart, a set of bearing rollers interposed between each ring and the hub casing, a rotatable retaining disk abutting the outer end of each race ring and one of the casing shoulders, a retaining collar for each end of the axle locked thereto, and rotatable end thrust bearing members interposed between the respective retaining disks and collars.

5. A wheel hub bearing comprising a hub casing, an axle concentrically disposed therein in spaced relation thereto, two spaced arched collars on the axle, an externally shouldered race ring seated on each collar, a spacing sleeve connected to the race rings, and a set of rotatable bearing members held in each shouldered race ring and spacing the hub casing therefrom.

6. In a wheel hub bearing, means for maintaining a hub casing in concentric relation to an axle provided with two arched bearing collars spaced longitudinally thereon, comprising a shouldered race ring seated on each collar and held in spaced relation by a connecting sleeve interposed between the axle and hub casing, a set of rotatable bearing members for the hub casing seated on each race ring, and a retaining disk held against the outer end of each race ring and co-operating with the shoulder thereof so as to prevent lateral displacement of the rotatable radial bearing members.

7. A wheel hub bearing having in combination with a hub casing and an axle located therein in spaced relation thereto, an arched bearing collar on the axle, a race ring seated on the collar and locked against rotation with respect thereto, a set of bearing rollers supported by the race ring and spacing the hub casing therefrom, and means for maintaining said parts in fixed longitudinal relation so as to maintain the bearing rollers, hub casing and race ring in concentric relation regardless of flexure of the axle.

8. A wheel hub bearing having in combination with a hub casing and an axle located therein in spaced relation thereto, an arched bearing collar on the axle, a race ring seated on the collar and keyed thereto so as to prevent relative rotary movement and permit relative lateral movement, and a set of bearing rollers held in the bearing ring and spacing the hub casing therefrom, the bearing surface of the collar being so shaped as to compensate for any flexure of the axle and prevent cramping of the bearing rollers between the hub casing and race ring.

9. A wheel hub bearing having in combination with a hub casing and an axle located therein in spaced relation thereto, two arched bearing collars for the axle spaced longitudinally thereon, a race ring seated on each bearing collar, a spacing sleeve connecting the race rings, a set of bearing rollers rotatably held in each ring and spacing the hub casing therefrom, and end thrust bearing members for each end of the axle located adjacent and outside the bearing roller race rings.

10. In combination, an axle, a hub supported thereon by roller bearings, a retaining disk for said bearings having a ball race in one side thereof, a set of ball bearings surrounding the axle and located in said race, an annulus one side of which is convex contacting with the ball bearings, and a member one side of which is concave engaging the convex side of the annulus whereby the hub and axle are automatically maintained in alinement.

11. A wheel bearing, comprising a hub and an axle therefor, roller bearings interposed between the hub and axle, spaced arched circumferential bearing ribs formed on the axle at separated points, a race ring seated on each bearing rib and fastened thereto and supporting the roller bearings, and a spacing member interposed between the axle and hub and connected to the race rings.

12. A wheel hub bearing having in combination with a hub casing and an axle locked therein in spaced relation thereto, an arched bearing collar for the axle, a race ring seated on said bearing collar, a set of bearing rollers rotatably held in said race ring and spacing the hub casing therefrom, and an end thrust bearing member for the end of the axle located adjacent and outside the bearing roller race ring.

13. A wheel hub bearing having in combination with a hub casing and an axle located therein in spaced relation thereto, an arched bearing collar for the axle, a race ring seated on the bearing collar and keyed thereto, and a set of bearing rollers rotatably held in said race ring and spacing the hub casing therefrom.

In witness whereof, I have hereunto subscribed my name.

WILLIAM S. HARLEY.